(No Model.)
W. C. FERRY.
ATTACHMENT FOR PLOWS.
No. 387,504. Patented Aug. 7, 1888.
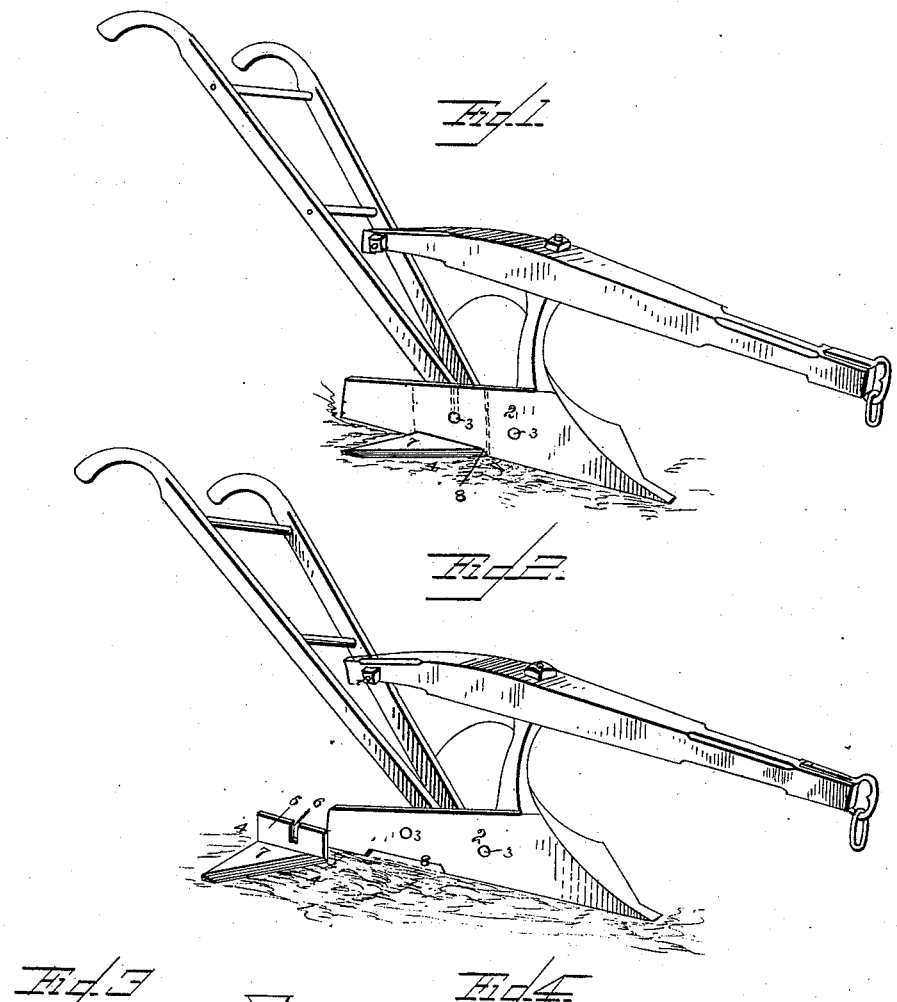
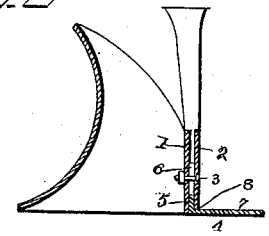
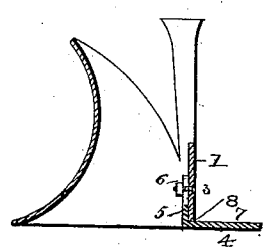
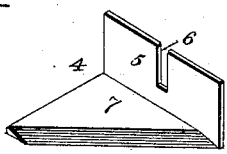
WITNESSES.
F. L. Durand
Benj. T. Cowl
William C. Ferry,
INVENTOR
by Louis Bagger & Co.
Attorneys
N. PETERS, Photo-Lithographer, Washington, D. C.

UNITED STATES PATENT OFFICE.

WILLIAM C. FERRY, OF FOWLER, INDIANA.

ATTACHMENT FOR PLOWS.

SPECIFICATION forming part of Letters Patent No. 387,504, dated August 7, 1888.

Application filed February 7, 1888. Serial No. 263,243. (No model.)

*To all whom it may concern:*

Be it known that I, WILLIAM C. FERRY, a citizen of the United States, and a resident of Fowler, in the county of Benton and State of Indiana, have invented certain new and useful Improvements in Landside Attachments for Plows; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a plow provided with my improved landside attachment. Fig. 2 is a similar view showing the plow ready to have the attachment secured to it and showing the attachment at the side of the plow in position to be secured to the plow. Fig. 3 is a vertical transverse sectional view of the plow and attachment. Fig. 4 is a similar view of a plow having the attachment secured to the inner side of the landside, and Fig. 5 is a perspective view of the attachment.

The same numerals of reference indicate the same or corresponding parts in all the figures.

My invention has relation to attachments for the landsides of plows, consisting of a laterally-projecting share secured at the foot of the landside to project laterally and to cut horizontally under the slice next to be turned; and it consists in the improved construction and combination of parts of such an attachment, as hereinafter more fully described and claimed.

In the accompanying drawings, the numeral 1 indicates the landside of the plow, which is provided with the usual wear-plate, 2, upon its outer face, secured by means of bolts 3, passing through the plate and landside. The lower edge of the wear-plate is formed with a longitudinal recess, 8, the object of which will be presently described.

The attachment 4 consists of a vertical portion, 5, having a vertical slot, 6, open at the upper end, and a horizontally-projecting part, 7, triangular in shape and having the forward edge rearwardly inclined and the rear edge at a right angle, or nearly so, to the landside. The vertical portion of the attachment is preferably secured, as shown in Figs. 2 and 3, between the wear-plate and the landside, having the vertical slot fitted upon one of the bolts securing the plate to the landside, and the horizontal extension fits in the recess 8 of the wear-plate. The vertical portion will thus be clamped securely between the said plate and landside when the nuts upon the bolts securing the plate to the landside are tightened. When the plow is not provided with a wear-plate upon the landside, the vertical portion will be secured with its slot upon the bolt upon the inner face of the landside, which will in this event be formed with a longitudinal recess, 8, the same as that formed in the wear-plate. Thus it will be seen that the attachment will be retained firmly in place against any jar caused by it suddenly striking an obstacle. If this recess were not formed in the lower edge of either the landside or the wear-plate, the bolts holding the attachment in place would be apt to be strained and cause the attachment to be twisted at an undesirable angle to the plow, which would render the device inoperative.

The outer face of the landside and the inner face of the wear-plate, or one of the said faces only, may be formed with a suitable recess for the reception and perfect fitting of the vertical portion of the attachment, and various changes may be made in the detailed construction of the attachment or in the landside without departing from the spirit of my invention.

The attachment is preferably secured to the landside near the heel of the same, being in plows having short landsides secured directly at the heel and in plows having longer landsides secured a short distance from the heel; but this position may be varied according to the working of the plow and the character of the soil in which the plow is used.

It will be seen that in plowing this share or lip, projecting laterally at the sole of the landside, will cut the slice of the following furrow partly loose, so that a wider furrow may be taken than with a plow not provided with this attachment, and the share or lip will also cause the plow to travel more steadily, as it affords a broader base than a common plow, and on account of the attachment cutting and loosening the slice at the landside the friction upon the landside will be reduced, as the soil is loosened at both sides of the plow.

It will be observed that by forming the attachment with the vertical slot it may be adjusted to plows which have the bolts projecting from the landsides thereof at different heights; or, in other words, the attachment may be either attached to a plow when the bolts for securing the handles project from the landside near its lower edge or it may be secured when the bolts project from the landside at any point higher, and in either case the horizontal portion of the attachment assumes the position shown in the drawings— that of being in the same horizontal plane as the lower edge of the landside.

I am aware that attachments similar to mine have been used heretofore; but such attachments are, as far as I am aware, either cast integral with the plow or are formed with bolt-holes, thus rendering them incapable of securement to plows of different sizes.

The width of the share or lip is preferably increased in inverse ratio to the width of the share upon the plow, as a plow having a narrow share will need to have the furrow cut free at a greater width than the plow having a wide share.

The forward edge of the attachment may be either straight or curved, and the rear edge, although preferably at a right angle to the face of the landside, will not need to be at this angle, but may be either at an acute or an obtuse angle to the same.

Having thus described my invention, I claim and desire to secure by Letters Patent of the United States—

1. The combination, with the plow having the lower edge of its landside formed with a longitudinal recess, of the share attachment consisting of a vertical portion formed with a vertical open slot, and further formed with a horizontal triangular share portion, and bolts and tightening-nuts, substantially as set forth.

2. An attachment for plows, consisting of the vertical portion formed with the slot adapted to engage with a bolt and a tightening-nut in the side of the plow, and further formed with the triangular horizontal portion beveled upon its forward edge to form a cutting-surface, substantially as set forth.

In testimony that I claim the foregoing as my own I have hereunto affixed my signature in presence of two witnesses.

WILLIAM C. FERRY.

Witnesses:
M. W. WALKER,
GEORGE H. GRAY.